UNITED STATES PATENT OFFICE.

THEODORE CRAMP WESTER, OF BALTIMORE, MARYLAND.

CAN-SEALING COMPOSITION.

1,341,489. Specification of Letters Patent. Patented May 25, 1920.

No Drawing. Application filed August 15, 1919. Serial No. 317,803.

*To all whom it may concern:*

Be it known that I, THEODORE CRAMP WESTER, a citizen of the United States, residing at Baltimore, in the State of Maryland, have invented certain new and useful Improvements in Can-Sealing Compositions, of which the following is a specification.

This invention relates to a composition of matter, and is especially useful as a packing to insure the hermetic sealing of sheet metal cans, particularly those used for preserving food products. It is especially intended for use in connection with what are known as "sanitary" cans, in which no solder is employed, but the heads are secured to the bodies by a folding and pressing operation known as "double seaming," thus forming an interlocking joint. It may be employed for the can bottom, which is applied, while the can is empty, as well as for the top, which is put on, of course, after the can has been filled with the food product, and sterilized or "processed." The composition, which is of a thick, sticky, elastic semi-liquid nature, is applied as a coating to one or both of the engaging surfaces, and thus forms a yielding seat to compensate for slight irregularities in the metal.

While compositions of this general character have heretofore been proposed, it is the object of the present invention to provide an improved plastic composition which will retain its elasticity over an extended period; which will be exceptionally smooth and homogeneous, thus increasing the number of cans sealed per gallon and insuring complete uniformity; and which will be unaffected by water, food juices, steam, dry heat, cold, pressure, or any other conditions met with during the canning process or subsequent storage. A further object is to provide means for insuring against the possibility of introducing bacteria into the can through the medium of the sealing compound.

My improved plastic composition, when solidified, forms a flexible, elastic, non-drying, adhesive, insoluble, odorless and tasteless gasket or seal between the can heads and bodies, thus absolutely preventing leakage of the contents, and protecting such contents against all external influences.

The base of the improved compound consists of special pure Pará rubber dissolved in some suitable volatile solvent such as benzol. In order, however, to preserve the softness and elasticity of this rubber solution, and prevent it from becoming hard, "set," or brittle, I employ as a softening agent suitable proportions of a drying vegetable oil such as china-wood oil, bees-wax or resin, or a combination of these substances. I have found that the desired end may be accomplished by the use of china-wood oil alone, or by bees-wax alone, or by china-wood oil and bees-wax, together, by china-wood oil and resin, together, or by resin and beeswax together. I have further found that the use of china-wood oil produces the best results, it being understood, of course, that it must not be employed in sufficient quantities to deteriorate the rubber.

In addition to increasing the "life" and elasticity of the rubber, the above substances increase the adhesiveness and spreading qualities of the plastic composition.

I have also found that the sealing qualities of the compound are improved by the addition of a small amount of sodium silicate. This forms a film at the surface of the gasket, and tends to absorb any liquid due to a minute leak.

In order to color or give body to the compound I preferably add a filler such as powdered domestic chalk or talc, the proportions of which may be varied as desired.

Heretofore, where trouble has been experienced by reason of the fermentation of carefully sterilized, processed and sealed cans, it has probably been caused by the introduction of bacteria into the can through the medium of the sealing compound itself. While such bacteria would be rendered dormant by the solvent employed, still, after the evaporation of such volatile solvent, the bacteria may become active again, and set up fermentation within the can. In order to avoid any possibility of this occurring, I propose to embody a germicide or preservative in the compound itself which serves to sterilize the same. While other substances may be employed, I prefer to use a small percentage of sodium benzoate, which, as is well known, is harmless when taken into the human system in very small quantities. The presence of such a substance in the compound effectually prevents the development of bacteria in the same, and thus insures the contents of the can from contamination in this way.

While, as above indicated, the ingredients and proportions may be widely varied, I find that the following formula gives excellent results:—

| | | |
|---|---|---|
| Benzol | 100 | galls. |
| Pure Pará rubber | 15.00 | lbs. |
| China-wood oil, or resin, or bees-wax (or ⅓ each or ½ any two) | 4.15 | " |
| Sodium silicate (saturated solution) | 1.66 | " |
| Domestic chalk or talc or mixture thereof, (powdered) | 6.66 | " |
| Sodium benzoate | 0.7 | " |

In preparing the improved compound, I first dissolve the rubber in the volatile vehicle, and then add the wax, oil and resin, or mixture thereof, in a liquid state. The silicate of soda solution is then added, cold, and the chalk stirred in, the sodium benzoate being finally put in. The whole is thoroughly mixed so as to form, a smooth, homogeneous pasty liquid.

What I claim is:—

1. A can sealing composition comprising rubber dissolved in a volatile solvent, and china wood oil.

2. A can sealing composition comprising rubber dissolved in benzol and china wood oil.

3. A plastic composition comprising rubber dissolved in a volatile solvent, and a drying vegetable oil and bees-wax as a softening agent.

4. A plastic composition comprising rubber dissolved in benzol, and a drying vegetable oil and bees-wax as a softening agent.

5. A plastic composition comprising rubber dissolved in a volatile solvent, and a drying vegetable oil, beeswax and resin as a softening agent.

6. A plastic composition comprising rubber dissolved in benzol, and a drying vegetable oil, bees-wax and resin as a softening agent.

7. A plastic composition comprising rubber dissolved in benzol, and china-wood oil, bees-wax and resin as a softening agent.

8. A can sealing composition comprising rubber dissolved in a volatile solvent, china wood oil, and a filler.

9. A can sealing composition comprising rubber dissolved in a volatile solvent, china wood oil, and sodium silicate.

10. A can sealing composition comprising rubber dissolved in a volatile solvent, china wood oil, sodium silicate, and a filler.

11. A composition of matter suitable as a packing to insure the hermetic sealing of sheet metal cans, comprising the following substances in substantially the proportions given:

| | | |
|---|---|---|
| Benzol | 100 | galls. |
| Pure Pará rubber | 15.00 | lbs. |
| China wood oil | 4.00 | lbs. |
| Sodium silicate | 1.7 | lbs. |
| Chalk | 6.7 | lbs. |
| Sodium benzoate | 0.7 | lbs. |

12. A can sealing composition composed of a non-fermentable material and containing a sterilizing germicide.

13. A can sealing composition comprising a rubber solution, a softening agent and a sterilizing germicide.

In testimony whereof I affix my signature.

THEODORE CRAMP WESTER.